United States Patent
Gu et al.

(10) Patent No.: US 11,494,399 B2
(45) Date of Patent: Nov. 8, 2022

(54) METHOD, DEVICE, AND COMPUTER-READABLE STORAGE MEDIUM FOR BITMAP CONVERSION

(71) Applicant: EMC IP Holding Company LLC, Hopkinton, MA (US)

(72) Inventors: Yuan Gu, Beijing (CN); Xin Zhong, Beijing (CN); Qinghua Ling, Beijing (CN); Yue Yang, Beijing (CN); Yan Shao, Beijing (CN); Lei Han, Beijing (CN); Jianbao Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 77 days.

(21) Appl. No.: 16/880,273

(22) Filed: May 21, 2020

(65) Prior Publication Data
US 2021/0133206 A1     May 6, 2021

(30) Foreign Application Priority Data
Oct. 30, 2019   (CN) .......................... 201911045956.2

(51) Int. Cl.
*G06F 16/25*   (2019.01)

(52) U.S. Cl.
CPC .................................. *G06F 16/258* (2019.01)

(58) Field of Classification Search
CPC .. G06F 16/258; G06F 16/172; G06F 16/1727; G06F 16/1794
See application file for complete search history.

(56) References Cited

U.S. PATENT DOCUMENTS

| | | | |
|---|---|---|---|
| 10,761,993 B2 | 9/2020 | Li et al. | |
| 10,853,209 B2 | 12/2020 | Yang et al. | |
| 10,942,845 B2 | 3/2021 | Chawla et al. | |
| 11,016,884 B2 | 5/2021 | Soukhman et al. | |
| 11,068,455 B2 | 7/2021 | Shabi et al. | |
| 2002/0099980 A1* | 7/2002 | Olarig | G06F 11/2007 710/1 |
| 2011/0153930 A1* | 6/2011 | Serizawa | G06F 3/0683 711/114 |
| 2011/0208694 A1* | 8/2011 | Bitar | G06F 11/2058 707/610 |
| 2013/0073826 A1* | 3/2013 | Tatara | G06F 3/065 711/E12.002 |
| 2015/0228107 A1* | 8/2015 | Zimmerman | G06T 1/60 345/419 |
| 2019/0132415 A1* | 5/2019 | Viswanathan | H04L 67/289 |

* cited by examiner

*Primary Examiner* — William B Partridge
*Assistant Examiner* — Aryan D Toughiry
(74) *Attorney, Agent, or Firm* — BainwoodHuang

(57) ABSTRACT

Techniques convert a first bitmap into a second bitmap. Such techniques involve determining a first plurality of bits in the first bitmap corresponding to a particular bit in the second bitmap; determining whether the first plurality of bits include a dirty bit as a unit of a processor line width; in response to determining that the first plurality of bits include a dirty bit, setting the particular bit as a dirty bit; and in response to determining that the first plurality of bits do not include a dirty bit, setting the particular bit as a non-dirty bit.

17 Claims, 8 Drawing Sheets

METHOD, DEVICE, AND COMPUTER-READABLE STORAGE MEDIUM FOR BITMAP CONVERSION

CROSS-REFERENCE TO RELATED APPLICATION

This application claims priority to Chinese Patent Application No. CN201911045956.2, on file at the China National Intellectual Property Administration (CNIPA), having a filing date of Oct. 30, 2019, and having "METHOD, DEVICE, AND COMPUTER-READABLE STORAGE MEDIUM FOR BITMAP CONVERSION" as a title, the contents and teachings of which are herein incorporated by reference in their entirety.

FIELD

Embodiments of the present disclosure relate generally to a storage systems, and more particularly to methods, devices, and computer-readable storage media for bitmap conversion.

BACKGROUND

In a storage system such as a synchronous storage system, different bitmaps can be set for different purposes to indicate a write operation of a file system. Depending on the system's specific situation and scenario requirements, it may be desirable to convert one bitmap to another. This conversion usually consumes system resources and affects the performance of the storage system. Therefore, it is necessary to provide a solution that can reduce the resource consumption of such a bitmap conversion.

SUMMARY

Embodiments of the present disclosure provide a method, a device, a computer-readable storage medium, and a computer program product for bitmap conversion.

In a first aspect, a method is provided for converting a first bitmap to a second bitmap. The method includes: determining a first plurality of bits in the first bitmap corresponding to a particular bit in the second bitmap; determining whether the first plurality of bits include a dirty bit as a unit of a processor line width; in response to determining that the first plurality of bits include a dirty bit, setting the particular bit as a dirty bit; and in response to determining that the first plurality of bits do not include a dirty bit, setting the particular bit as a non-dirty bit.

In a second aspect, a device is provided for converting a first bitmap into a second bitmap. The device includes: a processing unit; a memory coupled to the processing unit and including instructions stored thereon, the instructions, when executed by the processing unit, causing the device to perform acts including: determining a first plurality of bits in the first bitmap corresponding to a particular bit in the second bitmap; determining whether the first plurality of bits include a dirty bit as a unit of a processor line width; in response to determining that the first plurality of bits include a dirty bit, setting the particular bit as a dirty bit; and in response to determining that the first plurality of bits do not include a dirty bit, setting the particular bit as a non-dirty bit.

In a third aspect, a computer-readable storage medium is provided. The computer-readable storage medium includes computer-executable instructions stored thereon, when executed by at least one processor, causing the at least one processor to implement the method of the first aspect.

In a fourth aspect, a computer program product is provided, the computer program product being stored on a computer-readable medium and including machine-executable instructions that, when executed, cause a machine to perform the method of the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description on the example embodiments of the present disclosure with reference to the accompanying drawings, the above and other objectives, features and advantages of the present disclosure will become more apparent, in which the same reference symbols refer to the same components.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments disclosed herein will be described in detail below with reference to the accompanying drawings. Although the drawings illustrate the preferred embodiments of the present disclosure, it would be appreciated that the present disclosure can be implemented in various forms but cannot be limited by the embodiments described herein. Rather, those embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

Figure 1:
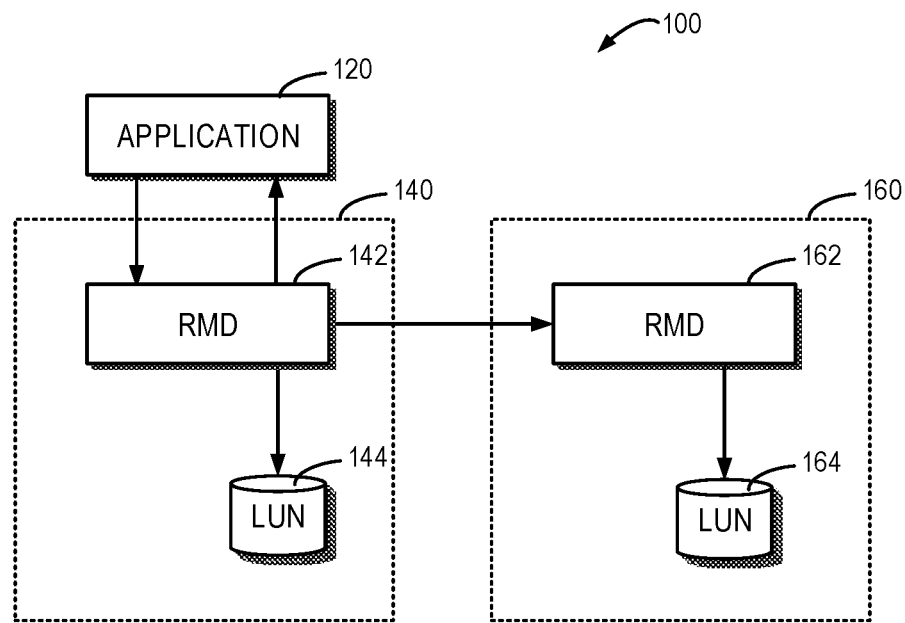
FIG. 1 illustrates a schematic diagram of a storage system according to some embodiments of the present disclosure.

FIG. 1 shows a schematic diagram of a write operation during a file system (FS) synchronous replication process of the storage system 100. When creating an FS synchronous replica, the remote mirror drives (RMD) 142 and 162 are automatically inserted into the data path of the file system of the first device 140 and the second device 160, respectively. The first device 140 may also be referred to as a master device, a local side or source device, and the second device 160 may also be referred to as a slave device, a remote side or destination device. It should be understood that although FIG. 1 shows one slave device, those skilled in the art can understand that multiple slave devices may be used.

As shown in FIG. 1, the first device 140 (for example, RMD 142) receives a write request from the application 120 and divides the write request into two write requests. One write request is provided to the underlying file system or logical unit or logical unit number (LUN) 144 on the local side, and the other write request is provided to the second device 160 on the remote side. The RMD 162 of the second device 160 provides the write request to the corresponding LUN 164. After the two write requests are completed, the RMD 142 will receive responses indicating the two write requests are completed respectively and provide the application 120 with a response indicating the write request is completed.

As shown in FIG. 1, to achieve data protection, mirror drives (for example, remote mirror drives 142 and 162) can be used to write the same IO to the source and destination arrays (for example, LUNs 144 and 164). The mirror drive uses two bitmaps to hold dirty blocks on the source array: one bitmap is a high-precision Fracture Log (FL) bitmap located on a volatile memory; the other is low-precision Write Intent Log (WIL) located on a nonvolatile memory. Generally, each write IO marks the corresponding bits in the WIL bitmap as dirty. When the transport channel becomes fractured (for example, the Optical Fiber between devices 140 and 160 is broken), the write IO also marks the corresponding bits in the FL bitmap as dirty. When the transport channel is recovered, the mirror drive continues to synchronize data to the destination array from the first dirty bit of the FL bitmap. Once the source array suddenly crashes and restarts later, the mirror drive could continue to synchronize data to the destination array from the first dirty bit of the WIL bitmap.

In some embodiments, there are some procedures that need to convert the entire FL into WIL and flush into disk. We will show two typical scenarios. One is the so-called lazy clean of WIL: once the dirty bits of WIL exceeds a ratio threshold (such as 20%), it will perform the conversion to clear the already-synchronized dirty bits. The clearing can be triggered by an in-fly write IO, so that the conversion time is a part of IO latency, which is strongly to be reduced as much as possible.

Another scenario is that once there are some procedures set dirty bits into FL bitmap apart from in-fly write IO (e.g. "mark diff" operation), mirror driver should convert FL into WIL to persist the dirty bits before data synchronization, because the memory-based FL bitmap will be lost once the array crashes, but WIL will not. In this period, the mirror driver needs to suspend all incoming IO before starting FL-to-WIL conversion, since in-fly writes will update both FL and WIL. Nevertheless, it has an impact on the availability—the following IOs have no choice but to be queued during this period, they will become pending to write into local disks and the destination array. Therefore, it is critically important to complete the conversion as fast as possible, otherwise the write pending queue will be too long and may cause I/O disruption to the hosts. Typically, the original conversion on the array takes from tens to hundreds of microseconds depending on the scale of the File system/LUN.

Figure 2:
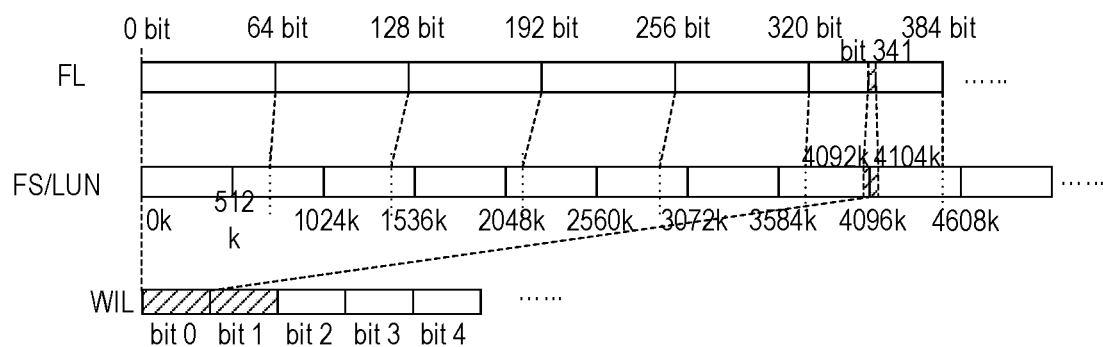
FIG. 2 shows a schematic diagram of a bitmap according to some embodiments of the present disclosure.

As shown in FIG. 2, the FL bitmap can map the entire File system/LUN to a high-precision bitmap, where one FL bit in the FL bitmap indicates a certain range of the file system/LUN. In addition, the low-precision WIL maps the entire file system/LUN to a WIL bitmap that is smaller than the FL bitmap. However, the file system/LUN area indicated by the FL bit and the corresponding WIL bit may have overlap. Taking FIG. 2 as an example, WIL bit 0 maps 0 KB-4096 KB, while FL bit 314 maps 4092 KB-4104 KB, and crosses the boundary of WIL bit 0, that is 4096 KB. Therefore, FL bit 341 will be mapped to WIL bit 0 and WIL bit 1.

If any FL bit in the range between the start FL bit and the end FL bit is "1", the corresponding WIL bit should be set to 1. On the other hand, if all FL bits in the range between the start FL bit and the end FL bit are "0", the corresponding WIL bit should be set to 0.

Figure 3:
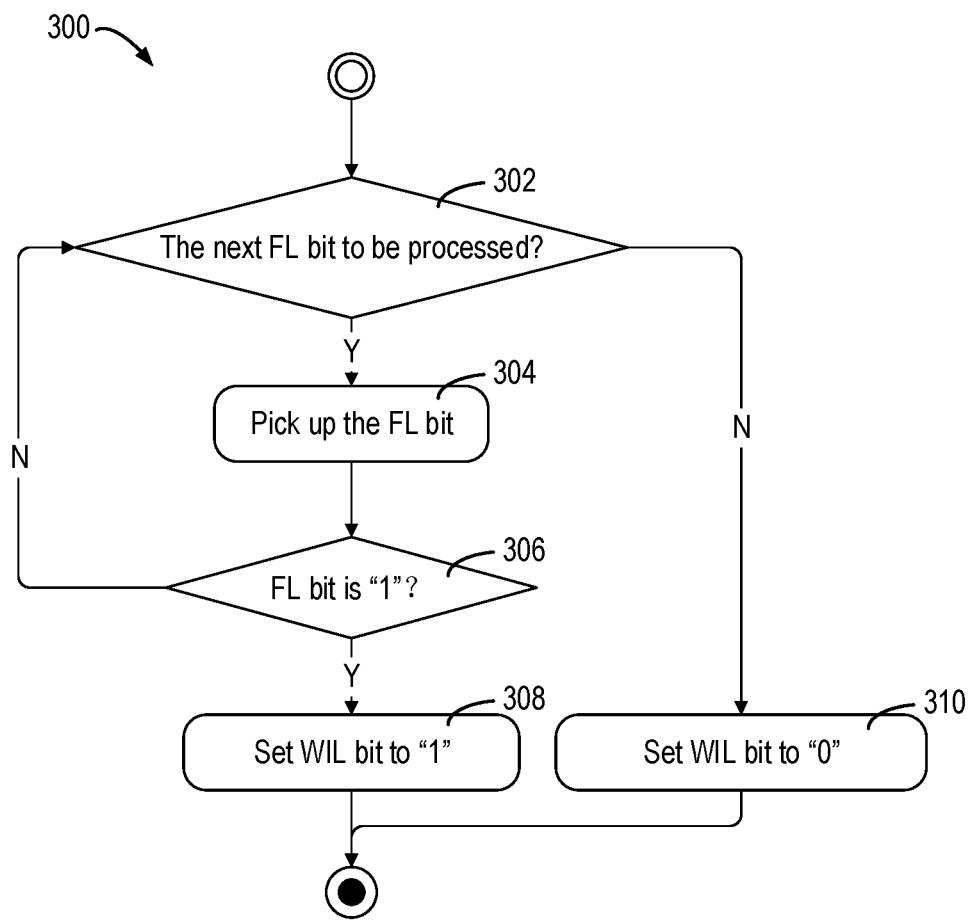
FIG. 3 illustrates a flowchart of a bitmap conversion method according to some embodiments of the present disclosure.

FIG. 3 shows a flowchart of a method 300 for converting a FL bitmap to a WIL bitmap. In general, in the method 300, it is determined whether one of the corresponding FL bits is 1 for each WIL bit in turn. If one bit is 1, the WIL bit is set to 1, and if all FL bits are 0, the WIL bit is set to 0.

The method 300 may determine a range of FL bits mapped to a WIL bit, and sequentially process all FL bits in the range. At 302, it is determined whether there are any FL bits left unprocessed. If it is determined at 302 that there is still FL to be processed, the method 300 proceeds to 304 to pick up an FL bit. It is determined at 306 whether the FL bit is one. If the bit is determined to be 1 at 306, the method 300 proceeds to 308 to set the WIL bit to 1. If it is determined at 306 that the bit is not 1, method 300 returns to 302 to determine if there are any FL bits that have not yet been processed. If it is determined at 302 that there are no unprocessed FL bits, it means that all FL bits are not 1 and the method 300 proceeds to 310 to clear the WIL bit or set the WIL bit to 0.

The time complexity of the method 300 is linearly related to the size of the FL bitmap, but the scale factor is very large.

For example, in the worst case, a 1 MB FL bitmap would require 10 million comparisons. Therefore, it is desirable to provide an improved conversion method.

Figure 4:
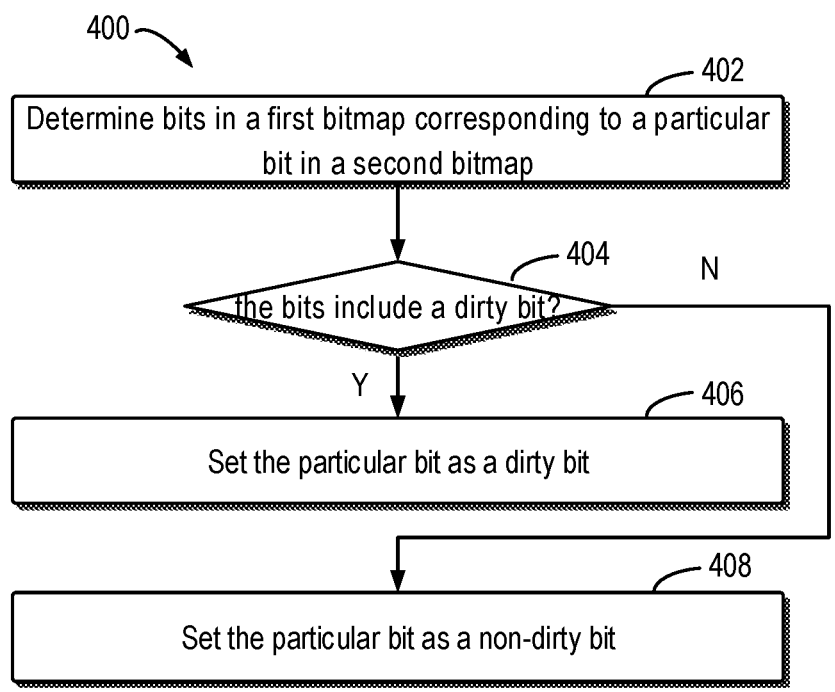
FIG. 4 shows a flowchart of a bitmap conversion method according to some embodiments of the present disclosure.

FIG. 4 illustrates a flowchart of a method 400 for bitmap conversion according to some embodiments of the present disclosure. For example, the method 400 can be applied to the environment shown in FIG. 1, however, it should be understood that the method 400 can also be applied to any other suitable environment.

At 402, it is determined a first plurality of bits in a first bitmap corresponding to a particular bit in a second bitmap. For example, the first bitmap may be stored in a volatile memory and the second bitmap may be stored in a non-volatile memory. The first bitmap may be an FL bitmap as described above, and the second bitmap may be a WIL bitmap as described above. However, those skilled in the art should understand that the method 400 may not be limited to the FL bitmap and the WIL bitmap.

At 404, it is determined whether the first plurality of bits include a dirty bit as a unit of a processor line width. Different from the method 300 shown in FIG. 3, the method 400 determines whether a corresponding bit in the first bitmap includes a dirty bit by using a processor line width as a unit. In the case where the dirty bits are very rare and particularly in the latter part in the corresponding range of the first bitmap, the method 400 has an advantage over the method 300.

Based on the length of the first plurality of bits and the alignment with the processor line width, the method 400 may have different processing methods. The processing methods of these cases will be described in the following, and the detailed description will be described later with reference to the examples of FIGS. 5 to 10.

In some embodiments, if it is determined that the first plurality of bits are aligned with the processor line width, sequentially determining whether a second plurality of bits of the first plurality of bits corresponding to the processor line width include a dirty bit. If it is determined that the second plurality of bits include a dirty bit, it is determined that the first plurality of bits include a dirty bit. If it is determined that the second plurality of bits do not include a dirty bit, the first plurality of bits do not include a dirty bit.

In some embodiments, in response to determining that the first plurality of bits are within one processor line width and at least one of a start bit and an end bit of the first plurality of bits is not aligned with the processor line width, a third plurality of bits including the first plurality of bits are read, the third plurality of bits being aligned with the processor line width; the first plurality of bits are extracted from the third plurality of bits by performing a bitwise AND operation with a mask corresponding to the at least one of the start bit and the end bit; and it is determined whether the extracted first plurality of bits include a dirty bit.

In some embodiments, determining whether the first plurality of bits has a dirty bit includes: in response to determining that the first plurality of bits are not within the processor line width, determining whether a start bit of the first plurality of bits is aligned with the processor line width; in response to determining that the start bit of the first plurality of bits is not aligned with the processor line width, reading a third plurality of bits including the start bit of the first plurality of bits, the third plurality of bits corresponding to the processor line width; extracting a fourth plurality of bits from the third plurality of bits by performing a bitwise AND operation with a mask corresponding to the start bit, the start bit of the fourth plurality of bits being the start bit of the first plurality of bits and an end bit of the fourth plurality of bits being aligned with the processor line width; in response to determining that the fourth plurality of bits include a dirty bit, determining that the first plurality of bits include a dirty bit; and sequentially determining whether the other bits of the first plurality of bits include a dirty bit as a unit of the processor line width.

In some embodiments, determining whether the other bits has a dirty bit includes: determining whether an end bit of a fifth plurality of bits in the other bits that are within the processor line width is aligned with the processor line width; in response to determining that the end bit of the fifth plurality of bits is not aligned with the processor line width, reading a sixth plurality of bits including the end bit of the fifth plurality of bits, the sixth plurality of bits corresponding to the processor line width; extracting the fifth plurality of bits from the sixth plurality of bits by performing a bitwise AND operation with a mask corresponding to the end bit; and in response to determining that the fifth plurality of bits include a dirty bit, determining that the first plurality of bits include a dirty bit.

If it is determined at 404 that the first plurality of bits include a dirty bit, the method 400 proceeds to 406 to set the particular bit in the second bitmap as a dirty bit. If it is determined at 404 that the first plurality of bits do not include a dirty bit, the method proceeds to 408 to set the particular bit to a non-dirty bit.

For other bits in the second bitmap, the method 400 can be used to determine whether these bits are dirty or not in turn.

Figure 5:
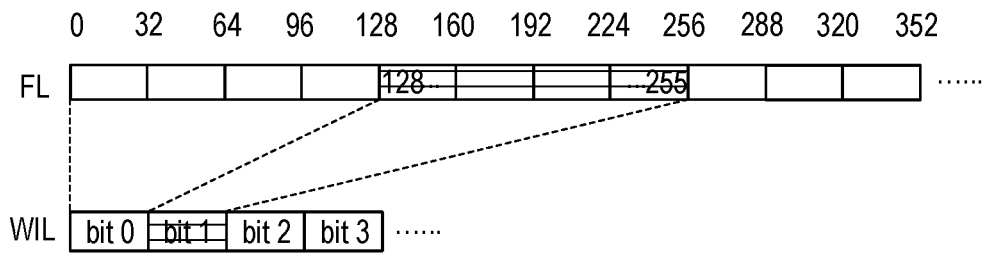
FIG. 5 shows a schematic diagram of a bitmap according to some embodiments of the present disclosure.

FIG. 5 shows a schematic diagram of a bitmap according to some embodiments of the present disclosure. As shown in FIG. 5, the start FL bit and the end FL bit of the FL bitmap corresponding to one bit in the WIL bitmap are aligned with the line width or data bus of the processor or CPU. Currently, the common processor line width is usually 32-bit or 64-bit. Here, 32-bit is used as an example for description. It should be understood that the embodiments of the present disclosure can be applied to any processor line width.

As shown in FIG. 5, bit 1 in the WIL bitmap corresponds to bits 128-255 in the FL bitmap, where bit 128 and bit 255 are aligned with the line width of a 32-bit processor. In the example shown in FIG. 5, the method 600 shown in FIG. 6 may be used for conversion. The method 600 shows how to process a bit in the WIL bitmap, however it should be understood that the method can be applied to any bit in the WIL bitmap. The individual bits in the WIL bitmap can be converted in parallel, sequentially, or its combination.

At 602, it is determined whether there are the next 32 bits in the FL bits corresponding to one WIL bit to be processed. If it is determined at 602 that there are the next 32 bits to process, the method 600 proceeds to 604 to pick up the 32 FL bits. At 606, it is determined whether the 32 FL bits are all 0 through a single comparison operation. If it is determined at 606 that they are not all 0s, the method 600 proceeds to 608 and sets the WIL bit to 1. Otherwise, the method 600 returns to 602 to determine if there are any FL bits that have not yet been processed. If it is determined at 602 that there are no outstanding FL bits, then all FL bits are 0, the method will proceed to 610 and set the WIL bit to 0.

Figure 7:
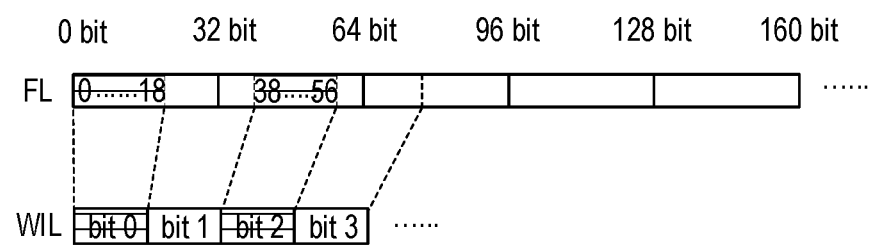
FIG. 7 shows a schematic diagram of a bitmap according to some embodiments of the present disclosure.

FIG. 7 illustrates a schematic diagram of a bitmap according to some embodiments of the present disclosure. As shown in FIG. 7, the FL bit area mapped to a WIL bit may be smaller than a processor line width (for example, 32 bits). Therefore, the start FL bit and the end FL bit may be within the same processor line width. Taking FIG. 7 as an example, this is the case for bit 0 and bit 2 in the WIL bitmap: its start FL bit and end FL bit are within the processor line width, and at least one of the start FL bit and the end FL bit is not aligned with the processed line width. WIL bit 0 maps to FL[0-18] bits, and WIL bit 2 maps to FL[38-56] bits.

Figure 6:
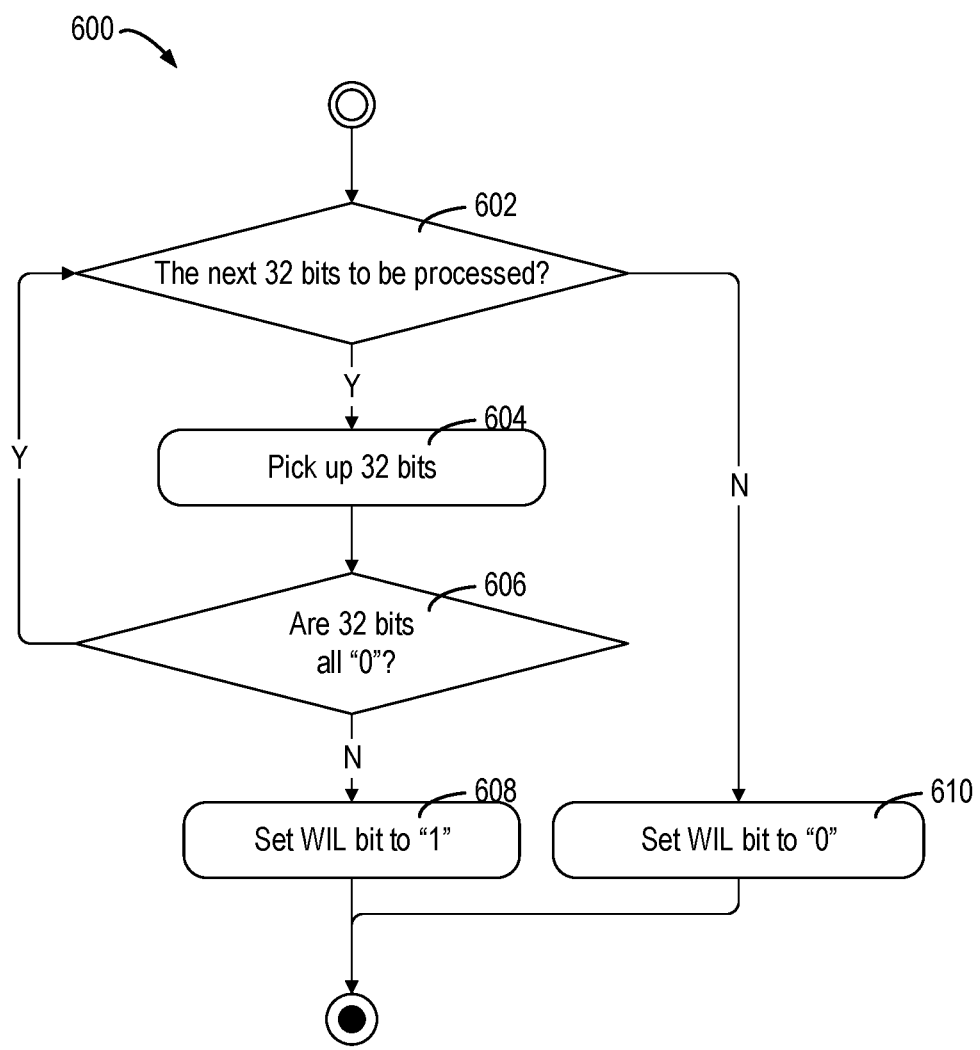
FIG. 6 shows a flowchart of a bitmap conversion method according to some embodiments of the present disclosure.

In this case, the FL bits outside the range of the processor line width can be trimmed, and then compared by the method shown in FIGS. 5-6. For example, a lookup table can be used for trimming. The lookup table can be a mapping between the number of bits in the processor line width and the number of bits in the mask, that is, <index: bit number, value: bit mask>. Taking a 32-bit line width little-endian processor as an example, the lookup table can be expressed as (described in C language):

```
unsigned int32 BitNumberMaskTable [ ] =
{
    0x80000000, 0xC0000000, 0xE0000000, 0xF0000000,
    0xF8000000, 0xFC000000, 0xFE000000, 0xFF000000,
    0xFF800000, 0xFFC00000, 0xFFE00000, 0xFFF00000,
    0xFFF80000, 0xFFFC0000, 0xFFFE0000, 0xFFFF0000,
    0xFFFF8000, 0xFFFFC000, 0xFFFFE000, 0xFFFFF000,
    0xFFFFF800, 0xFFFFFC00, 0xFFFFFE00, 0xFFFFFF00,
    0xFFFFFF80, 0xFFFFFFC0, 0xFFFFFFE0, 0xFFFFFFF0,
    0xFFFFFFF8, 0xFFFFFFFC, 0xFFFFFFFE, 0xFFFFFFFF
};
```

The lookup table is a bitwise mask. For example, the binary for 0x8 is 1000, the binary for 0xC is 1100, the binary for 0xE is 1110, and the binary for 0xF is 1111. According to this rule, the mask table is constructed from the 0th element to the last element. Therefore, if this table is represented in binary, the actual content is:

```
BitNumberMaskTable [0] = 100000000000000...000 (31 zeros)
BitNumberMaskTable [1] = 110000000000000...000 (30 zeros)
BitNumberMaskTable [2] = 111000000000000...000 (29 zeros)
......
BitNumberMaskTable [31] = 11111111111111111111 (32 1s)
```

It can be understood that the principle for the 64-bit table is the same, and if it is expressed in binary, the actual content is:

```
BitNumberMaskTable [0] = 100000000000000...000 (63 zeros)
BitNumberMaskTable [1] = 110000000000000...000 (62 zeros)
BitNumberMaskTable [2] = 111000000000000...000 (61 zeros)
......
BitNumberMaskTable [63] = 11111111111111111111 (64 1s).
```

[61] In order to exclude the second half of these FL bits (bits within the processor line width and after the end FL bit), you can select aligned 32 bits and perform a bitwise AND operation with the corresponding mask in the lookup table. The corresponding mask can be determined by the index of the number of the last FL bit. To exclude the first half of these FL bits (bits within the processor line width and before the beginning of the FL bit), you can first "shift right" one bit by the corresponding mask in the lookup table and invert it bitwise, and then The aligned 32 FL bits perform a bitwise AND operation.

Figure 8:
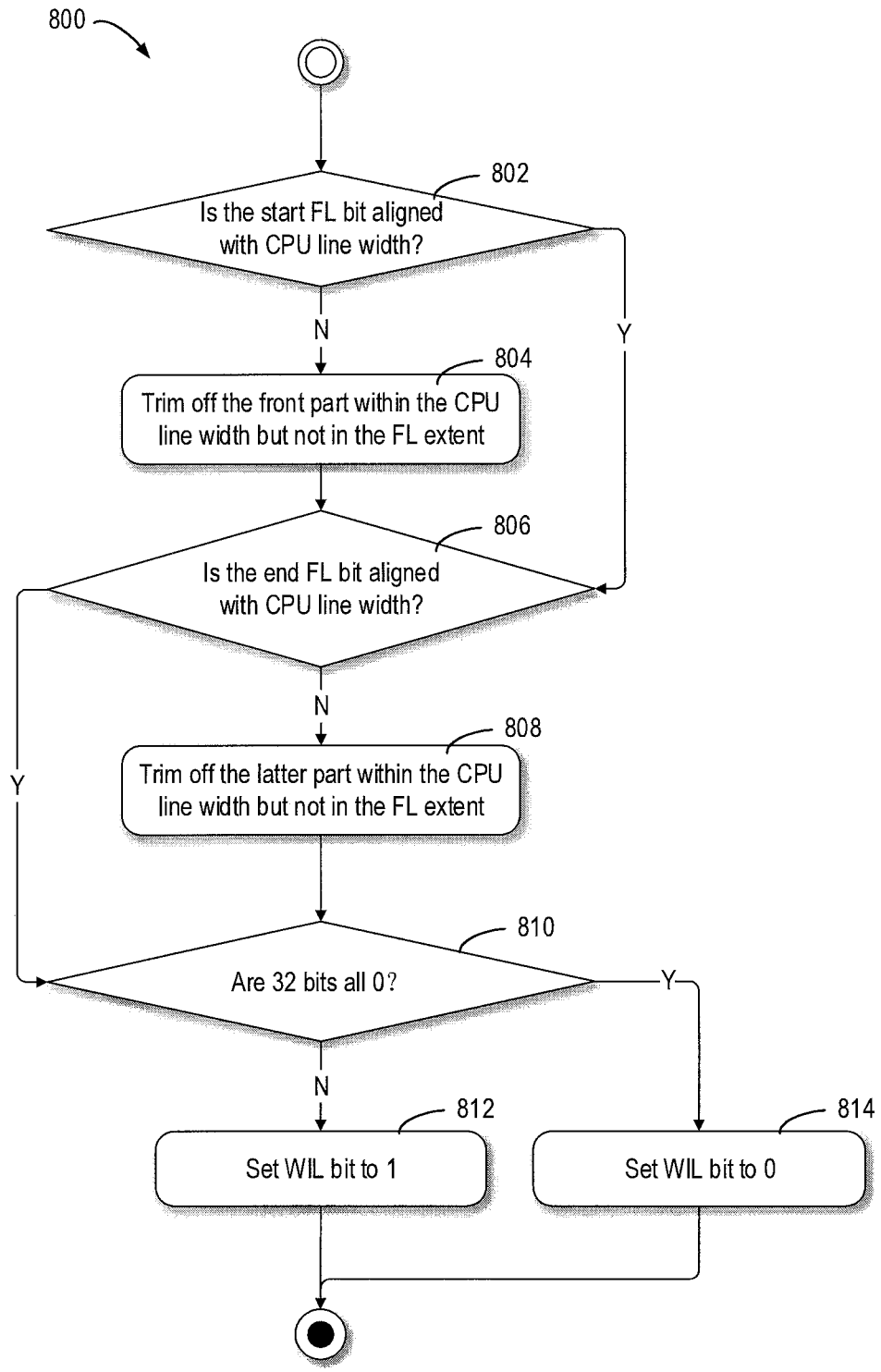
FIG. 8 shows a flowchart of a bitmap conversion method according to some embodiments of the present disclosure.

As shown in FIG. 7, FL[0-18] corresponding to WIL 0 is partially aligned with the processor line width portion (FL start bit 0 is aligned, FL end bit 17 is not aligned). FL[38-56] corresponding to WIL 2 is completely misaligned. Considering trimming, the final FL range to be compared to zero can be calculated as follows:

$FL[0{\sim}18\ bit] = FL[0{\sim}31\ bit]\ \&\ BitNumberMaskTable\ [18\ mod\ 32] =$ $FL[0{\sim}31\ bit]\ \&\ BitNumberMaskTable\ [18] = FL[0{\sim}31\ bit]\ \&$ $0xFFFFE000(19\ "1s"\ on\ the\ left;\ 13\ "0s"\ on\ the\ right)$ $FL[38{\sim}56\ bit]right\ part = FL[32{\sim}63]\ \&\ {\sim}$ $(BitNumberMaskTable\ [38\ mod\ 32]<<1) =$ $FL[32{\sim}63\ bit]\ \&\ {\sim}(BitNumberMaskTable\ [6]<<1) =$ $FL[32{\sim}63\ bit]\ \&\ {\sim}(0xFE000000<<1) =$ $FL[32{\sim}63\ bit]\ \&\ {\sim}0xFC000000 = FL[32{\sim}63\ bit]\ \&$ $0x03FFFFFF(6\ "0s"\ on\ the\ left;\ 26\ "1s"\ on\ the\ right)$ $FL[38{\sim}56\ bit]left\ part = FL[32{\sim}63\ bit]\ \&$ $BitNumberMaskTable\ [56\ mod\ 32] =$ $FL[32{\sim}63\ bit]\ \&\ BitNumberMaskTable\ [24] = FL[32{\sim}63\ bit]\ \&$ $0xFFFFFF80(25\ "1s"\ on\ the\ left;\ 7\ "0s"\ on\ the\ right)$ $FL[38{\sim}56\ bit] = FL[38{\sim}56\ bit]\ right\ part\ \&\ FL[38{\sim}56\ bit]\ left\ part =$ $FL[32{\sim}63\ bit]\ \&\ 0x03FFFFFF\ \&\ 0xFFFFFF80 =$ $FL[32{\sim}63\ bit]\ \&\ 0x03FFFF80(6\ "0s"\ on\ the\ left,$ $19\ "1s"\ on\ the\ middle;\ 7\ "0s"\ on\ the\ right)$ In fact, the above trimming method can also be applied to the case of alignment. In order to reduce the number of accesses to the lookup table, a judging branch can be added before trimming to determine whether the start FL bit and the end FL bit are aligned. FIG. 8 shows a flowchart of a method 800 that can be used for the bitmap of FIG. 7.

At 802, it is determined whether the starting FL bit is aligned with the processor line width. If it is determined at 802 that the start FL bit is not aligned with the processor line width, the method 800 proceeds to 804 and trims the front portion outside the FL range within the processor line width. The method 800 then proceeds to 806 to determine if the ending FL bit is aligned with the processor line width. If it is determined at 806 that the end FL bit is not aligned with the processor line width, the method proceeds to 808 and trims the rear part outside the FL range within the processor line width. The method 800 then proceeds to 810 to determine if the 32 bits are all zeros. If it is determined at 810 that the 32 bits are not all 0s, the method 800 proceeds to 812 and sets the WIL bit to 1. If it is determined at 810 that the 32 bits are all 0s, the method 800 proceeds to 814 and sets the WIL to 0.

If it is determined at 802 that the start FL bit is aligned with the processor line width, the method 800 proceeds to 806. If it is determined at 806 that the end FL bit is aligned with the processor line width, the method 800 proceeds to 810. It should be understood that 802 and 806 may also be omitted, and the trimming operations in 804 and 806 may be performed directly.

Figure 9:
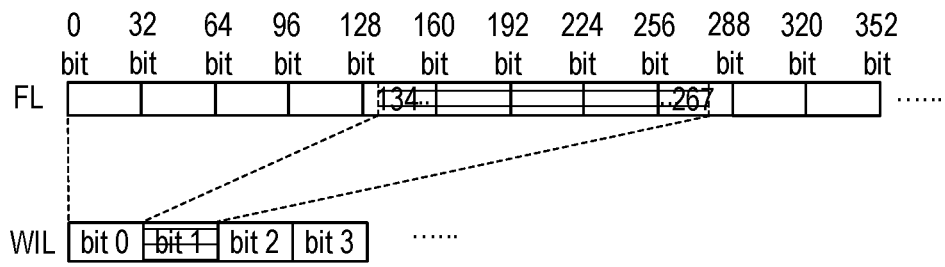
FIG. 9 illustrates a schematic diagram of a bitmap according to some embodiments of the present disclosure.

FIG. 9 illustrates a schematic diagram of a bitmap according to some embodiments of the present disclosure. As shown in FIG. 9, the FL bit area mapped to a WIL bit is larger than a processor line width (for example, 32 bits) and is not aligned with the processor line width, especially both the start and end bits are misaligned with the processor line width. The middle area (for example, FL [160-255] in FIG. 9) can be divided into several aligned sections (for example, [160-191], [192-223], and [224-255] in FIG. 9). Therefore, in order to set or clear the WIL bit, the middle part can be processed by the method shown in FIGS. 5 to 6, and the two end parts can be processed by the method shown in FIGS. 7 to 8.

Figure 10:
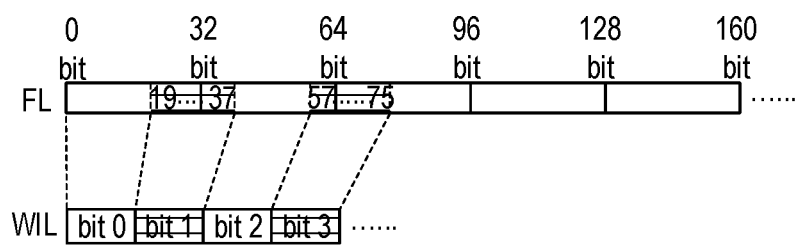
FIG. 10 illustrates a schematic diagram of a bitmap according to some embodiments of the present disclosure.

FIG. 10 illustrates a schematic diagram of a bitmap according to some embodiments of the present disclosure. FIG. 10 is basically the same as FIG. 7 except that the corresponding FL bits of WIL bits 1 and 3 are shown. FIG. 10 can be regarded as a special case in which FIG. 9 does not include the middle portion, and the two end portions thereof can be trimmed by the methods shown in FIGS. 7 to 8 respectively.

According to an embodiment of the present disclosure, the number of cycles of the FL bitmap can be reduced to $\frac{1}{32}$ (32-bit CPU) or $\frac{1}{64}$ (64-bit CPU). Therefore, the IO delay during FL conversion can be significantly reduced or the time for FL conversion can be significantly reduced. The mask table can be stored in the processor's cache, such as the L1 cache. For example, the mask table can take up 128 bytes (for a 32-bit processor) or 512 bytes (for a 64-bit processor). However, this space cost is relatively low compared to the size of the L1 cache (usually a few kilobytes).

In a specific example, the FL bitmap is set to 2M bit size, the resolution ratio of FL to WIL is 16, and the processor line width is 32 bits. When the FL bits are randomly set to dirty bits, the most significant optimization scenario is that the proportion of dirty bits is almost zero. At this point, the number of traversals was optimized from 2M to 196K. The worst optimization scenario is that the proportion of dirty bits is almost 100%, which is a small improvement over the method 300. For common application scenarios, especially the above-mentioned lazy clean and non-write IO conversion schemes, the proportion of FL dirty bits is usually relatively low. Therefore, the method 400 can effectively improve the performance of the storage system.

Figure 11:
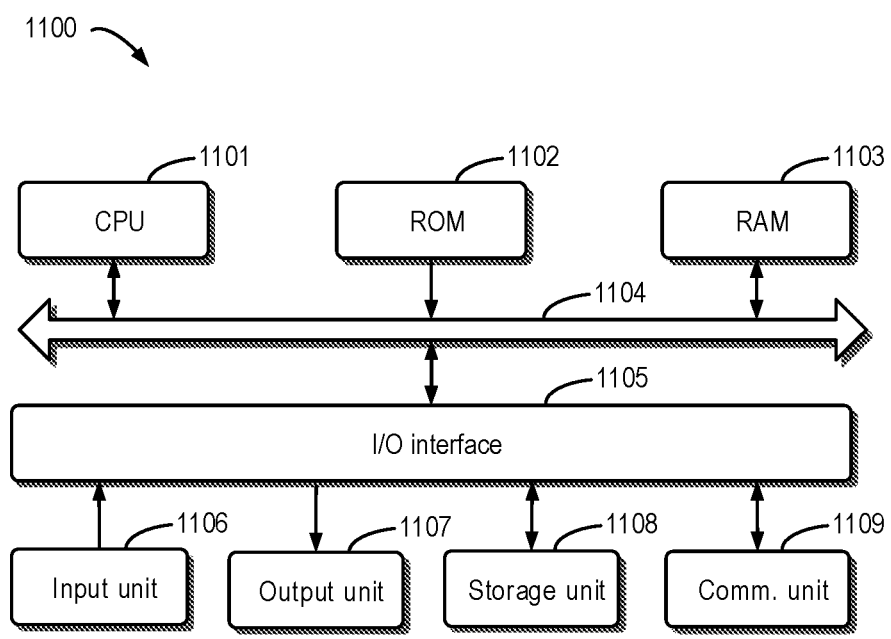
FIG. 11 illustrates a schematic block diagram of an example device that can be used to implement embodiments of the present disclosure, according to some embodiments of the present disclosure.

FIG. 11 illustrates a device 1100 that can implement embodiments of the present disclosure. As shown, the device 1100 includes a central processing unit (CPU) 1101 that can perform various appropriate acts and processing based on computer program instructions stored in a read-only memory (ROM) 1102 or computer program instructions loaded from a storage unit 1108 to a random access memory (RAM) 1103. In the RAM 1103, there further store various programs and data needed for operations of the device 1100. The CPU 1101, ROM 1102 and RAM 1103 are connected to each other via a bus 1104. An input/output (I/O) interface 1105 is also connected to the bus 1104.

The following components in the device 1100 are connected to the I/O interface 1105: an input unit 1106, such as a keyboard, a mouse and the like; an output unit 11011, such as various kinds of displays and a loudspeaker, etc.; a storage unit 1108, such as a magnetic disk, an optical disk, and etc.; a communication unit 1109, such as a network card, a modem, and a wireless communication transceiver, etc. The communication unit 1109 allows the device 1100 to exchange information/data with other devices through a computer network such as the Internet and/or various kinds of telecommunications networks.

Various processes and processing described above, e.g., the methods 500-600, can be executed by the processing unit 1101. For example, in some embodiments, the methods 500-600 can be implemented as a computer software program that is tangibly embodied on a machine readable medium, e.g., the storage unit 1108. In some embodiments, part or all of the computer programs can be loaded and/or mounted onto the device 1100 via ROM 1102 and/or communication unit 1108. When the computer program is loaded to the RAM 1103 and executed by the CPU 1101, one or more steps of the methods 500-600 as described above can be executed.

The present disclosure can be a method, a device, a system and/or a computer program product. The computer program product can include a computer readable storage medium on which computer readable program instructions are carried out for performing each aspect of the present application.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for converting a first bitmap into a second bitmap, comprising:
   determining a first plurality of bits in the first bitmap corresponding to a particular bit in the second bitmap, wherein bits marked as dirty in the first bitmap and bits marked as dirty in the second bitmap indicate dirty blocks on a source array of a local mirror drive in a data storage system, wherein responsive to a restart of the source array after a crash of the source array, synchronization of data from the source array to a destination array is continued beginning at a location of dirty blocks on the source array indicated by a first dirty bit of the second bitmap;
   determining whether the first plurality of bits include a dirty bit as a unit of a processor line width;
   in response to determining that the first plurality of bits include a dirty bit, setting the particular bit as a dirty bit; and
   in response to determining that the first plurality of bits do not include a dirty bit, setting the particular bit as a non-dirty bit.

2. The method of claim 1, wherein determining whether the first plurality of bits include a dirty bit comprises:
   in response to determining that the first plurality of bits are aligned with the processor line width, sequentially determining whether a second plurality of bits of the first plurality of bits corresponding to the processor line width include a dirty bit; and
   in response to determining that the second plurality of bits include a dirty bit, determining that the first plurality of bits include a dirty bit.

3. The method of claim 1, wherein determining whether the first plurality of bits include a dirty bit comprises:
   in response to determining that the first plurality of bits are within one processor line width and at least one of a start bit and an end bit of the first plurality of bits is not aligned with the processor line width, reading a third plurality of bits including the first plurality of bits, the third plurality of bits being aligned with the processor line width;
   extracting the first plurality of bits from the third plurality of bits by performing a bitwise AND operation with a mask corresponding to the at least one of the start bit and the end bit; and
   determining whether the extracted first plurality of bits include a dirty bit.

4. The method of claim 1, wherein determining whether the first plurality of bits includes a dirty bit comprises:
   in response to determining that the first plurality of bits are not within the processor line width, determining whether a start bit of the first plurality of bits is aligned with the processor line width;
   in response to determining that the start bit of the first plurality of bits is not aligned with the processor line width, reading a third plurality of bits including the start bit of the first plurality of bits, the third plurality of bits corresponding to the processor line width;

extracting a fourth plurality of bits from the third plurality of bits performing a bitwise AND operation with a mask corresponding to the start bit, the start bit of the fourth plurality of bits being the start bit of the first plurality of bits and an end bit of the fourth plurality of bits being aligned with the processor line width;

in response to determining that the fourth plurality of bits include a dirty bit, determining that the first plurality of bits include a dirty bit; and sequentially determining whether the other bits of the first plurality of bits include a dirty bit as a unit of the processor line width.

5. The method of claim 4, wherein determining whether the other bits include a dirty bit comprises:

determining whether an end bit of a fifth plurality of bits in the other bits that are within the processor line width is aligned with the processor line width;

in response to determining that the end bit of the fifth plurality of bits is not aligned with the processor line width, reading a sixth plurality of bits including the end bit of the fifth plurality of bits, the sixth plurality of bits corresponding to the processor line width;

extracting the fifth plurality of bits from the sixth plurality of bits by performing a bitwise AND operation with a mask corresponding to the end bit; and in response to determining that the fifth plurality of bits include a dirty bit, determining that the first plurality of bits include a dirty bit.

6. The method of claim 1, wherein the first bitmap is stored in a volatile memory and the second bitmap is stored in a non-volatile memory.

7. A device for converting a first bitmap into a second bitmap, comprising:

a processing unit;

a memory coupled to the processing unit and including instructions stored thereon, the instructions, when executed by the processing unit, causing the device to perform acts comprising:

determining a first plurality of bits in the first bitmap corresponding to a particular bit in the second bitmap, wherein bits marked as dirty in the first bitmap and bits marked as dirty in the second bitmap indicate dirty blocks on a source array of a local mirror drive in a data storage system, wherein responsive to a restart of the source array after a crash of the source array, synchronization of data from the source array to a destination array is continued beginning at a location of dirty blocks on the source array indicated by a first dirty bit of the second bitmap;

determining whether the first plurality of bits include a dirty bit as a unit of a processor line width;

in response to determining that the first plurality of bits include a dirty bit, setting the particular bit as a dirty bit; and in response to determining that the first plurality of bits do not include a dirty bit, setting the particular bit as a non-dirty bit.

8. The device of claim 7, wherein determining whether the first plurality of bits include a dirty bit comprises:

in response to determining that the first plurality of bits are aligned with the processor line width, sequentially determining whether a second plurality of bits of the first plurality of bits corresponding to the processor line width include a dirty bit; and in response to determining that the second plurality of bits include a dirty bit, determining that the first plurality of bits include a dirty bit.

9. The device of claim 7, wherein determining whether the first plurality of bits include a dirty bit comprises:

in response to determining that the first plurality of bits are within one processor line width and at least one of a start bit and an end bit of the first plurality of bits is not aligned with the processor line width, reading a third plurality of bits including the first plurality of bits, the third plurality of bits being aligned with the processor line width;

extracting the first plurality of bits from the third plurality of bits by performing a bitwise AND operation with a mask corresponding to the at least one of the start bit and the end bit; and determining whether the extracted first plurality of bits include a dirty bit.

10. The device of claim 7, wherein determining whether the first plurality of bits includes a dirty bit comprises:

in response to determining that the first plurality of bits are not within the processor line width, determining whether a start bit of the first plurality of bits is aligned with the processor line width;

in response to determining that the start bit of the first plurality of bits is not aligned with the processor line width, reading a third plurality of bits including the start bit of the first plurality of bits, the third plurality of bits corresponding to the processor line width;

extracting a fourth plurality of bits from the third plurality of bits performing a bitwise AND operation with a mask corresponding to the start bit, the start bit of the fourth plurality of bits being the start bit of the first plurality of bits and an end bit of the fourth plurality of bits being aligned with the processor line width;

in response to determining that the fourth plurality of bits include a dirty bit, determining that the first plurality of bits include a dirty bit; and sequentially determining whether the other bits of the first plurality of bits include a dirty bit as a unit of the processor line width.

11. The device of claim 10, wherein determining whether the other bits include a dirty bit comprises:

determining whether an end bit of a fifth plurality of bits in the other bits that are within the processor line width is aligned with the processor line width;

in response to determining that the end bit of the fifth plurality of bits is not aligned with the processor line width, reading a sixth plurality of bits including the end bit of the fifth plurality of bits, the sixth plurality of bits corresponding to the processor line width;

extracting the fifth plurality of bits from the sixth plurality of bits by performing a bitwise AND operation with a mask corresponding to the end bit; and in response to determining that the fifth plurality of bits include a dirty bit, determining that the first plurality of bits include a dirty bit.

12. The device of claim 7, wherein the first bitmap is stored in a volatile memory and the second bitmap is stored in a non-volatile memory.

13. A computer program product having a non-transitory computer readable medium which stores a set of instructions to convert a first bitmap into a second bitmap; the set of instructions, when carried out by computerized circuitry, causing the computerized circuitry to perform a method of:

determining a first plurality of bits in the first bitmap corresponding to a particular bit in the second bitmap, wherein bits marked as dirty in the first bitmap and bits marked as dirty in the second bitmap indicate dirty blocks on a source array of a local mirror drive in a data storage system, wherein responsive to a restart of the source array after a crash of the source array, synchronization of data from the source array to a destination array is continued beginning at a location of dirty blocks on the source array indicated by a first dirty bit of the second bitmap;

determining whether the first plurality of bits include a dirty bit as a unit of a processor line width;

in response to determining that the first plurality of bits include a dirty bit, setting the particular bit as a dirty bit; and in response to determining that the first plurality of bits do not include a dirty bit, setting the particular bit as a non-dirty bit.

14. The method of claim 1, further comprising:

marking bits as dirty in the second bitmap in response to write requests received from an application; and additionally marking bits as dirty in the first bitmap in response to write requests received from the application while a transport channel between the local mirror drive and a remote mirror drive is broken.

15. The method of claim 14, wherein each individual bit in the first bitmap corresponds to a first number of blocks in the source array of the local mirror drive in the data storage system;

wherein each individual bit in the second bitmap corresponds to a second number of blocks in the source array of the local mirror drive in the data storage system; and wherein the second number of blocks is larger than the first number of blocks.

16. The method of claim 15, further comprising starting to set bits in the first bitmap in response to write requests received from the application in response to detecting that the transport channel between the local mirror drive and the remote mirror drive is broken.

17. The method of claim 16, further comprising, in response to detecting that the transport channel between the local mirror drive and the remote mirror drive is no longer broken, continuing synchronization of data from the source array to the destination array beginning at a location of dirty blocks in the source array indicated by a first dirty bit of the first bitmap.

* * * * *